United States Patent [19]

Sato

[11] 4,239,710

[45] Dec. 16, 1980

[54] DEVICE FOR CHECKING RANDOM ADJUSTMENT OF ADJUSTABLE PARTS OF CARBURETOR

[75] Inventor: Motoki Sato, Nagoya, Japan

[73] Assignee: Aisan Industry Co., Ltd., Aichi, Japan

[21] Appl. No.: 13,644

[22] Filed: Feb. 21, 1979

[30] Foreign Application Priority Data

Mar. 3, 1978 [JP] Japan .................................. 53/24867

[51] Int. Cl.³ .......................................... F16K 35/10
[52] U.S. Cl. ............................ 261/65; 261/DIG. 38; 137/382; 137/384; 137/385; 292/307 B; 292/316
[58] Field of Search ............... 261/DIG. 38, 39 B, 65, 261/410; 137/384, 385, 382; 292/307 B, 307 A, 307 R, 316, 327

[56] References Cited

U.S. PATENT DOCUMENTS

| 369,242 | 8/1887 | Higgin .................................. 292/316 |
| 983,140 | 1/1911 | Hucke ............................... 292/307 R |
| 991,479 | 5/1911 | Cathels ................................ 137/385 |
| 1,179,648 | 4/1916 | Personette ....................... 292/307 R |
| 1,186,760 | 6/1916 | Elliott ................................ 292/307 B |
| 1,529,775 | 3/1925 | Dennett ........................... 292/307 R |
| 2,033,371 | 3/1936 | Benaggio ............................ 137/384 |
| 2,178,160 | 10/1939 | Berry ................................ 292/307 R |
| 2,618,473 | 11/1952 | Whitford ...................... 261/DIG. 38 |
| 3,227,428 | 1/1966 | Charron ............................. 261/39 B |
| 3,454,264 | 7/1969 | Sarto ............................ 261/DIG. 38 |
| 3,484,084 | 12/1969 | Simpson et al. ............. 261/DIG. 38 |
| 3,618,906 | 11/1971 | Charron .............................. 137/385 |
| 3,995,900 | 12/1976 | Humble et al. ...................... 292/316 |
| 4,062,090 | 12/1977 | Moolenaars ..................... 292/307 R |
| 4,097,561 | 6/1978 | Seki et al. .................... 261/DIG. 38 |
| 4,120,918 | 10/1978 | Codling ......................... 261/DIG. 38 |
| 4,152,377 | 5/1979 | Takata ................................ 261/39 B |

FOREIGN PATENT DOCUMENTS

| 226146 | 7/1962 | Austria ............................... 292/307 R |
| 2548226 | 5/1976 | Fed. Rep. of Germany ... 261/DIG. 38 |
| 2552100 | 6/1977 | Fed. Rep. of Germany ... 261/DIG. 38 |
| 602438 | 12/1925 | France ............................... 292/307 R |
| 2331691 | 6/1977 | France ............................ 261/DIG. 38 |

OTHER PUBLICATIONS

Controlling Exhaust Emissions, The Ethyl Corp., 2–68, pp. 1–8.

Primary Examiner—Tim R. Miles

[57] ABSTRACT

A device for checking random adjustment of the adjustable parts of a carburetor comprising a locked cover or covers mounted over the adjusting screw heads on the adjustable parts so that the cover or covers can not be removed without breaking it. Thus, the device is intended to inhibit the user or "layman" from improperly adjusting the adjustable parts of the carburetor. Provision of the cover or covers is also helpful in preventing the screws from becoming loose under vibration or other external forces.

12 Claims, 8 Drawing Figures

U.S. Patent
Dec. 16, 1980
4,239,710
FIG. 1
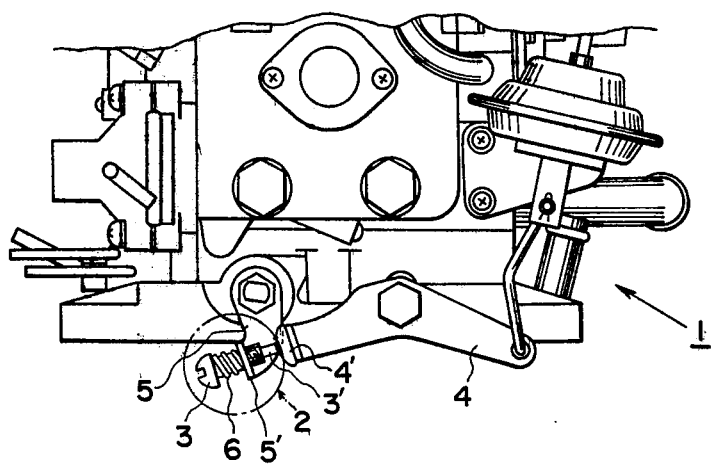
FIG. 2A
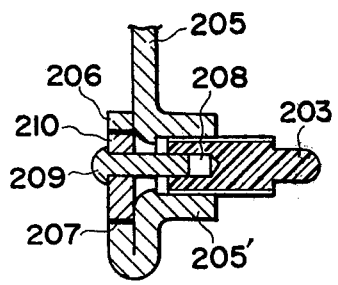
FIG. 2B
FIG. 3
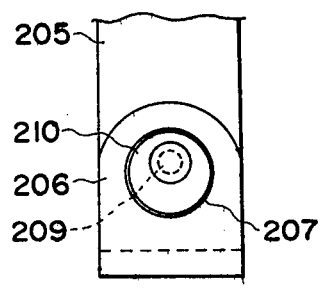
FIG. 4A
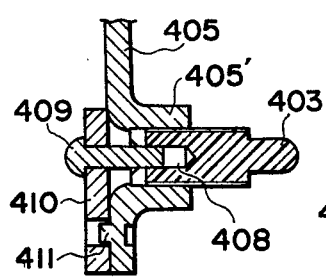
FIG. 4B
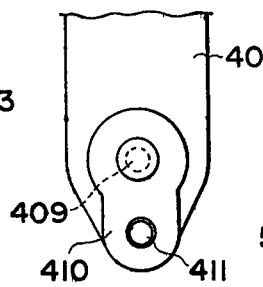
FIG. 5A
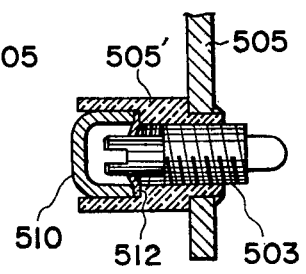
FIG. 5B
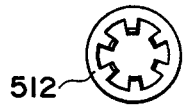

DEVICE FOR CHECKING RANDOM ADJUSTMENT OF ADJUSTABLE PARTS OF CARBURETOR

FIELD OF THE INVENTION

This invention relates to a device for protecting the adjustable parts of the automobile carburetor against random adjustment by the user or "layman".

BACKGROUND OF THE INVENTION

The adjusting elements for the various adjustable parts of the carburetor, such as for example mixture adjusting screws or set screws for automatic choke, can be adjusted with ease, even for layman, by using a specific tool.

The carburetor is an important unit for properly setting the fuel-air mixing ratio in the mixture to be supplied to the internal combustion engine, so that if the adjustable parts of the carburetor are adjusted at random, the correct mixing ratio preset at the manufacturing factory may be deranged to cause imperfect combustion of the mixture and uncontrolled release of harmful exhaust gas into the atmosphere.

SUMMARY OF THE INVENTION

This invention is to provide a device for checking random adjustment of the adjustable parts of carburetor by mounting a cover or covers over the screw heads on the respective adjustable parts such that said cover or covers cannot be removed without breaking it, that is, readjustment of any adjustable part can be made only when the cover thereof is broken away. The cover means provided in this invention also proves helpful in preventing the screws from becoming loose when exposed to vibrations or other external forces.

Thus, there is provided according to this invention a device for checking random adjustment of the adjustable parts of a carburetor comprising at least one cover mounted over the adjusting screw heads, said cover being fixed in position so that it cannot be removed without being deformed, that is, the cover must be broken away for obtaining access to the adjusting screw heads. This invention is also envisaged to provide a means adapted with relation to said cover mounting for locking the screws against any free movement.

BRIEF DESCRIPTION OF THE DRAWINGS

FIG. 1 is a front view showing the position of an adjustable part in a conventional carburetor unit;

FIGS. 2 to 5 illustrate four embodiments of the device according to this invention as adapted to an adjusting screw, wherein FIG. 2A is a sectional front view, FIG. 2B is a side view, FIG. 3 is a sectional front view, FIG. 4A is a sectional front view, FIG. 4B is a side view, FIG. 5A is a sectional front view and FIG. 5B is a side view of a stopper.

DESCRIPTION OF THE PREFERRED EMBODIMENTS

Referring to FIG. 1, there is shown by way of an example an adjustable part 2 provided in a carburetor 1, said adjustable part 2 comprising an adjusting screw 3 held in position by a screw holder 5' in a lever 5 through a spring 6. The above lever is fixedly mounted on the shaft of a throttle valve for a carburetor and rotated simultaneously with the throttle valve and a throttle lever. Numeral 4 refers to another lever of which the end 4' to be adjusted is engaged with the adjusting end 3' of said screw 3. FIGS. 2 to 5 illustrate an adaptation of this invention to the said adjustable part, particularly to the adjusting screw. In FIG. 2, reference numeral 205 indicates a lever formed with a screw holder 205' in which an adjusting screw 203 is threadedly engaged and held in position. Numeral 206 shows a cover holder formed integral with the lever 205 (it may be provided separately from the lever 205 and secured thereto by a suitable means) and provided with a hole 207 designed to allow mounting and demounting of the screw 203 and so arranged that its center is not aligned with the center of the screw 203. Designated by numeral 210 is a cover which fits in the hole 207 of said cover holder 206 and is secured in position by driving a pin 209 into the hole 208 of the screw 203, said pin being secured to the cover 210. Said hole 207 and cover 210 are not necessary to be circular in shape as shown in the drawings; they may be elliptical or polygonal, and in the latter case, they need not be disaligned from each other. In FIG. 3, numeral 305 refers to a lever having secured thereto a screw holder 305' in which an adjusting screw 303 is threadedly engaged. Said screw 303 has formed therein a hole 308 into which a pin planted on the cover 310 is driven. The cap portion of said cover 310 is pressed into the holder 305' or they are dovetailed to each other. In the latter case, the cover cap portion and the receiving portion of the holder 305' are shaped elliptical, polygonal or in other suitable configurations so that they are engaged unmovable relative to each other.

In the embodiment shown in FIG. 4, cover 410 is secured in position by driving a pin 409 into the hole 408 of the adjusting screw 403 which is threadedly engaged in its holder 405' formed in a lever 405. Said cover 410 is also checked against its rotative movement by a protuberance 411 provided at a part of the lever 405. In the embodiment shown in FIG. 5, as in the case of the embodiment of FIG. 3, an adjusting screw 503 is threadedly engaged in a holder 505' secured to a lever 505, and a cover 510 is press-fitted into said holder 505' to enclose the operating head portion of the screw 503. Numeral 512 indicates an elastic ring-shaped stopper provided with a plurality of pawls on its inner peripheral surface, said pawls being so designed that when the cover is press-fitted, said pawls will tightly engage with the outer periphery of the screw to inhibit any casual movement thereof. In any of the above-described embodiments, the cover is either made of an easily destroyable material or so constructed that it can be easily broken.

Referring to the embodiment of FIG. 2, when the adjusting screw 203 is threadedly engaged into the holder portion 205' of the lever 205 and the pin 209 secured to the cover 210 is driven into the pin-receiving hole in the screw head after the suitable screw adjustment has been made, the cover 210 is snugly housed in the hole 207 of the cover holder 206. When it becomes necessary to make a readjustment, the cover 210 is broken and the pin 209 is removed to allow access to the adjusting screw for making the desired readjustment. In the embodiment of FIG. 3, first the adjusting screw 303 is threadedly engaged into the holder 305' secured to the lever 305 and, after making a desired adjustment, the pin portion integrated with the cover 310 is driven into the pin-receiving hole 308 formed in the screw head and the cap portion of the cover 310 is press-fitted into the holder 305', or said cap portion shaped in a suitable configuration such as elliptical or polygonal is dovetailed into the similarly configured hole in the holder 305' so as to inhibit any casual movement of the screw 303 relative to the holder 305'. For making a readjustment, the cover 310 is broken away as in the case of the embodiment of FIG. 2.

In the embodiment of FIG. 4, the cover 410 is checked against its casual movement by a protuberance 411, and in the embodiment of FIG. 5, any natural movement of the adjusting screw 503 is prevented by the pressed engagement of the stopper 512 and cover 510, and also the cover 510 is press-fitted into the screw holder 505' to inhibit access to the adjusting screw. The cover 510 must be broken away for making a readjustment as in the case of the preceding embodiments.

Thus, according to the present invention, any adjusting operation on any adjustable part in the carburetor can not be made without breaking away the cover or covers, and also any casual return movement of the screw is prevented by an element such as a pin adapted to inhibit a no-break removal of the cover or an element such as a stopper designed to perform its function upon mounting of the cover in position. Therefore, any adjustable part in the carburetor which plays a very important role in controlling exhaust gas from an internal combustion engine can be maintained in the initial proper setting, and it is also possible to prevent any abnormal movement such as casual return of the screws due to vibrations or other external forces. Further, the device of this invention can prevent any improper adjustment by the user who is not familiar to such adjusting work or at a site with no proper measuring equipment, and also allows maintenance of controlled exhaust gas emission from an internal combustion engine after it is sold to a user.

What is claimed is:

1. A device for checking random adjustment of an adjustable part of a carburetor comprising a cover attached to the operating head portion of an adjusting screw such that said cover can never be removed without being deformed, whereby the exposure of said operating head for adjusting purpose cannot be made without breaking said cover, a stopper mounted on said adjusting screw, said adjusting screw is screwed into a screw holder into which said cover is forced, such that said stopper is pressed by said cover so as to be pressingly retained by said screw.

2. A device for checking random adjustment of an adjustable part of a carburetor comprising a cover attached to the operating head portion of an adjusting screw such that said cover can never be removed without being deformed, whereby the exposure of said operating head for adjusting purpose cannot be made without breaking said cover, said device further comprising means provided in connection with said cover and adapted for preventing said screw from being naturally loosened, wherein
a stopper is mounted on said adjusting screw, said adjusting screw is screwed into a screw holder into which said cover is forced, such that said stopper is pressed by said cover so as to be pressingly retained by said screw.

3. A device for checking random adjustment of adjustable parts of a carburetor, comprising
an adjusting screw means for optimizing the mixing ratio of fuel and air to be introduced into an internal combustion engine and having an operating head portion,
means comprising an engagement portion at said head portion thereof adapted for operable engagement with an adjusting tool,
a screw holder having a bore, said adjusting screw means is inserted into said bore,
a cover fixed to said screw holder and enclosing the entire surface of said operating head portion of said adjusting screw means such that said operating head portion of said adjusting screw means can be put into an operable condition by breaking said cover,
prevention means in connection with said cover for preventing said screw means from being naturally loosened by itself,
said prevention means comprises,
a protuberence on said screw holder,
a pin fixedly disposed through said cover,
said cover is fitted on said screw holder with said pin driven into said adjusting screw means such that said cover engages said protuberance on said screw holder.

4. The device as set forth in claim 3, wherein said cover is round and is formed with a recess off-set from its center, said protuberance extends into said recess.

5. A device for checking random adjustment of adjustable parts of a carburetor, comprising
an adjusting screw means for optimizing the mixing ratio of fuel and air to be introduced into an internal combustion engine and having an operating head portion,
means comprising an engagement portion at said head portion thereof adapted for operable engagement with an adjusting tool,
a screw holder having a bore, said adjusting screw means is inserted into said bore,
a cover fixed in said screw holder and enclosing the entire surface of said operating head portion of said adjusting screw means such that said operating head portion of said adjusting screw means can be put into an operable condition by breaking said cover.

6. The device as set forth in claim 5, wherein said stopper is annular shaped and has a plurality of pawls on an inner periphery thereof, said pawls tightly engage with an outer periphery of said adjusting screw means, said cover is cup-shaped with a free end operatively pressingly engaging the stopper adjacent an outer periphery thereof.

7. A device for checking random adjustment of adjustable parts of a carburetor, comprising
an adjusting screw means for optimizing the mixing ratio of fuel and air to be introduced into an internal combustion engine and having an operating head portion,
means comprising an engagement portion at said head portion thereof adapted for operable engagement with an adjusting tool,
a screw holder having a bore, said adjusting screw means is inserted into said bore,
a cover fixed to said screw holder and enclosing the entire surface of said operating head portion of said adjusting screw means such that said operating head portion of said adjusting screw means can be put into an operable condition by breaking said cover, prevention means in connection with said cover for preventing said screw means from being naturally loosened by itself, said prevention means comprises a pin fixedly connected to said cover, said cover closely fits into said screw holder with said pin driven into said adjusting screw means.

8. The device as set forth in claim 7, wherein said cover is non-circular and said screw holder forms a non-circular opening in which said cover is fitted.

9. The device as set forth in claim 7, wherein said pin is disposed through said cover.

10. The device as set forth in claim 7, wherein said adjusting screw means and said cover are disposed in said screw holder axially offset, said cover is circular.

11. The device as set forth in claim 10, wherein said pin is positioned axially in said adjusting screw means and offset from the center of said cover.

12. The device as set forth in claims 8 or 9, wherein said pin is removable from said screw means when said cover is broken off said screw holder.

* * * * *

UNITED STATES PATENT AND TRADEMARK OFFICE
CERTIFICATE OF CORRECTION

PATENT NO. : 4,239,710
DATED : December 16, 1980
INVENTOR(S) : Motoki Sato

It is certified that error appears in the above-identified patent and that said Letters Patent are hereby corrected as shown below:

Column 4 (Claim 5)  Line 38 "in" should read --to--

Line 43 "cover." should read --cover, prevention means in connection with said cover for preventing said screw means from being naturally loosened by itself, said prevention means comprises, a stopper fitting on said adjusting screw means, said cover is driven into said screw holder and said adjusting screw means is fitted in said screw holder such that said stopper is pressed by said cover and fixed on said adjusting screw means.--

Signed and Sealed this

Twelfth Day of May 1981

[SEAL]

Attest:

RENE D. TEGTMEYER

Attesting Officer

Acting Commissioner of Patents and Trademark